Patented May 2, 1939

2,156,341

UNITED STATES PATENT OFFICE 2,156,341

PROCESS FOR MAKING AND RECOVERING ETHYLENE OXIDE

Herbert Langwell, Windmill End, Epsom, and Herbert Muggleton Stanley, Tadworth, England, assignors to Carbide and Carbon Chemicals Corporation, a corporation of New York No Drawing. Application November 21, 1936, Serial No. 112,081. In Great Britain November 22, 1935

7 Claims. (Cl. 260—348)

This invention relates to the manufacture of ethylene oxide. In processes for the oxidation of ethylene to ethylene oxide, a gaseous product is obtained which contains concentrations of ethylene oxide of about 1 to 6 per cent, together with carbon dioxide, water vapor and permanent gases. The extraction of ethylene oxide from such product is not wholly practicable by scrubbing with a solvent at atmospheric pressure, owing to the limited solubility of gaseous ethylene oxide in solvents under the low partial pressure conditions prevailing. It is likewise undesirable to compress the product in order to improve the extraction by scrubbing, since a high pressure would be needed to give reasonably concentrated solutions, and would be liable to give rise to mixtures of explosive composition.

We have now found that active carbon adsorbs ethylene oxide from gas mixtures of the kind referred to without at the same time adsorbing excessive amounts of the accompanying gases. From the saturated carbon, the ethylene oxide can be displaced in any convenient way, preferably by means of steam, so as to give relatively concentrated solutions of ethylene oxide which serve as such, either for preparing compounds of ethylene oxide or for obtaining the pure substance itself. Other desorbing agents including hydrocarbons, for example benzene, or halogenated hydrocarbons, such as carbon tetrachloride, or mixtures of such materials, may be used in place of steam.

Suitable active carbons for use in this invention may be selected from those commonly used as adsorbents, including various active charcoals and other activated carbon, such as the products shown and described in N. K. Chaney Patents 1,497,543 and 1,497,544, issued June 10, 1924.

The presence of water vapor in the gases from which the ethylene oxide is to be recovered requires that the period of adsorption should not be unduly long, as otherwise some hydrolysis of the ethylene oxide to ethylene glycol may take place, and necessitate the extraction of the glycol from the carbon before its reuse.

When ths desorption process is carried out with steam, it is advisable to dry the carbon in a very thorough manner prior to using it for subsequent adsorptions, as otherwise the accumulation of glycol on the carbon may become pronounced, with resultant reduction in adsorbing capacity. Drying is conveniently effected by passing a stream of air, or other inert gas, preheated to a temperature of 120° to 250° C., through the moist carbon, preferably in a downward direction, for a sufficient period of time. In addition, heat may be supplied to the carbon during the drying by means of internal steam coils. This drying step is also carried out when using hydrocarbons or halogenated hydrocarbons as desorbing agents. The hot, dry carbon may be cooled either directly by cold air, or other inert gas, or indirectly, by internal cooling coils, or by both methods, after which adsorption can be resumed.

In order to avoid hydrolysis when using water vapor (steam) for the purpose of desorbing the ethylene oxide from the saturated carbon, care has to be taken that the carbon be not overheated before the ethylene oxide is desorbed. This may be achieved, for example, by making the adsorbing tower or column tall in comparison with its diameter, or by admitting the desorbing steam slowly. A convenient method of effecting desorption of the adsorbed ethylene oxide is by passing wet steam in a downward direction through a bed of the carbon until the bed is thoroughly moistened with water at 100° C., after which the desorption may be completed with superheated steam with or without the assistance of internal steam coils. The products of desorption consist of gaseous ethylene oxide admixed with small proportions of other gases, together with condensed steam retaining some ethylene oxide in solution. The most convenient method of recovering pure ethylene oxide is to pass the gaseous products of desorption up a suitable adsorption tower where practically all of the ethylene oxide can be washed out (on account of its relatively high partial pressure) by means of a suitable solvent, such as water, at atmospheric pressure. The resulting solution of ethylene oxide can be fractionated in a suitable still, operating at atmospheric or superatmospheric pressure, to furnish pure ethylene oxide. The small amount of gases remaining undissolved in the wash tower can be again passed through the bed of carbon for complete recovery of its ethylene oxide content.

An alternative method of recovering the ethylene oxide from the products of desorption consists in cooling the gaseous mixture sufficiently to liquefy out the ethylene oxide together with the condensed steam, and then fractionating the resulting aqueous solution of ethylene oxide as already described. This procedure, however, suffers from the disadvantage that ethylene oxide forms a high melting hydrate (of the composition $C_2H_4O \cdot 8H_2O$, melting at $+12°$ C.) which tends to choke cooling coils and pipes.

Example 1

A gas mixture, containing 1.5% by volume of ethylene oxide in addition to about 4% by volume of carbon dioxide and small amounts of ethylene as well as oxygen and nitrogen was formed by oxidizing ethylene over a silver catalyst at 200° to 400° C. This mixture was passed at the rate of about 1,000 litres per hour through a charcoal absorber containing 25 litres of dried adsorbent charcoal of 8 to 14 mesh. The exit gas contained no ethylene oxide until the adsorption had proceeded for 44 hours, at which point an analysis showed the presence of 0.15% by volume of ethylene oxide in the exit gas. The adsorption was stopped after 45 hours and desorption was effected with wet steam, the gaseous products of desorption being washed with cold water at atmospheric pressure in a packed tower. In this way 1140 grams of ethylene oxide were obtained in the form of a 6% aqueous solution while the undissolved gas (returned to the charcoal absorber for further treatment) amounted to only 100 litres (N. T. P.) with an ethylene oxide content of about 30 grams. The total ethylene oxide obtainable was, thus, 1170 grams, representing a recovery of about 95% of the theoretical.

In addition, the equivalent of about 2% of the ethylene oxide adsorbed was recovered as ethylene glycol.

Example 2

A gas mixture containing 5.3% by volume of ethylene oxide was passed at a rate of 2,000 litres per hour through a tower containing 25 litres of dried adsorbent charcoal, similar to that used in Example 1. All the ethylene oxide was adsorbed until the experiment had continued for nine and one-half hours, when an analysis showed the presence of 0.1% of ethylene oxide in the exit gas. After eleven hours adsorption (when the ethylene oxide in the exit gas was 0.5% by volume) the experiment was stopped, and the ethylene oxide was desorbed and recovered as an aqueous solution as described in Example 1. The ethylene oxide obtained amounted to 1975 grams, representing a recovery of about 95% of that adsorbed. In addition, the equivalent of about 25 grams of ethylene oxide was recovered as ethylene glycol.

Modifications of the process set forth will be apparent, and such variations are included within the scope of our invention as defined by the appended claims.

We claim:

1. In a process for making ethylene oxide, the steps which comprise passing ethylene and an oxygen-containing gas in intimate contact, at an elevated temperature, with a catalyst capable of causing the formation of gaseous ethylene oxide in the products of oxidation, selectively adsorbing the ethylene oxide from the resultant gaseous products in active carbon, and recovering the adsorbed ethylene oxide from said carbon by means of the vapors of a volatile desorbing agent of the group consisting of water, hydrocarbons and halogenated hydrocarbons.

2. In a process for making ethylene oxide, the steps which comprise passing ethylene and an oxygen-containing gas over a silver catalyst at a temperature between 200° and 400° C., selectively adsorbing the ethylene oxide from the gaseous products in active carbon, and recovering the adsorbed ethylene oxide from said carbon by means of a vaporous desorbing agent of the group consisting of steam, hydrocarbons and halogenated hydrocarbons.

3. In a process for making ethylene oxide, the steps which comprise passing ethylene and an oxygen-containing gas over a silver catalyst at a temperature between 200° and 400° C., selectively adsorbing the ethylene oxide from the gaseous products in active carbon, and recovering the adsorbed ethylene oxide from said carbon by means of steam.

4. In a process for making ethylene oxide, the steps which comprise passing ethylene and an oxygen-containing gas over a silver catalyst at a temperature between 200° and 400° C., selectively adsorbing the ethylene oxide from the gaseous products in active carbon, recovering the adsorbed ethylene oxide from said carbon by means of steam, and thereafter drying the carbon before reuse.

5. In a process for making ethylene oxide the steps which comprise passing ethylene and an oxygen-containing gas over a silver catalyst at a temperature between 200° and 400° C., selectively adsorbing the ethylene oxide from the gaseous products in active carbon, recovering the adsorbed ethylene oxide from said carbon by means of steam, and thereafter drying the carbon by means of heated air before reuse.

6. In a process for recovering ethylene oxide from the resultant gaseous products of oxidation obtained on passing ethylene and an oxygen-containing gas in intimate contact, at an elevated temperature, with a catalyst capable of causing the formation of gaseous ethylene oxide in the products of oxidation, the steps which comprise selectively adsorbing the ethylene oxide from said resultant gaseous products in active carbon, recovering the adsorbed ethylene oxide from said carbon by means of steam, forming an aqueous solution of said recovered ethylene oxide and subsequently distilling said solution to obtain said ethylene oxide, heating said desorbed active carbon in a gaseous current to a substantially glycol-free state, and again using said active carbon for further adsorption of ethylene oxide from said resultant gaseous products.

7. In a continuous process for making ethylene oxide, the steps which comprise passing ethylene and an oxygen-containing gas over a silver catalyst at a temperature between 200° and 400° C., selectively adsorbing the ethylene oxide from the gaseous products in active carbon, desorbing the ethylene oxide from said carbon by means of water vapor, forming an aqueous solution of said desorbed ethylene oxide and recovering ethylene oxide therefrom, heating the desorbed carbon in a gaseous current to free it of substantially all remaining ethylene oxide and reaction products of ethylene oxide, and again using said active carbon for further adsorption of ethylene oxide.

HERBERT LANGWELL.
HERBERT MUGGLETON STANLEY.